United States Patent
Hayes et al.

(10) Patent No.: US 11,269,631 B2
(45) Date of Patent: Mar. 8, 2022

(54) EXTENDING FUSED MULTIPLY-ADD INSTRUCTIONS

(71) Applicant: GHOST LOCOMOTION INC., Mountain View, CA (US)

(72) Inventors: John Hayes, Mountain View, CA (US); Volkmar Uhlig, Cupertino, CA (US)

(73) Assignee: GHOST LOCOMOTION INC., Mountain View, CA (US)

( * ) Notice: Subject to any disclaimer, the term of this patent is extended or adjusted under 35 U.S.C. 154(b) by 0 days.

(21) Appl. No.: 16/942,104

(22) Filed: Jul. 29, 2020

(65) Prior Publication Data
US 2022/0035628 A1 Feb. 3, 2022

(51) Int. Cl.
*G06F 9/30* (2018.01)

(52) U.S. Cl.
CPC ........ *G06F 9/3001* (2013.01); *G06F 9/30181* (2013.01)

(58) Field of Classification Search
CPC ............................ G06F 9/3001; G06F 9/30181
See application file for complete search history.

(56) References Cited

U.S. PATENT DOCUMENTS

| | | | | |
|---|---|---|---|---|
| 7,237,096 B1* | 6/2007 | Prabhu | ................ | G06F 9/30181 |
| | | | | 712/217 |
| 9,495,166 B2* | 11/2016 | Gopal | ................ | G06F 9/30032 |
| 2007/0038848 A1* | 2/2007 | Gschwind | ............ | G06F 9/3802 |
| | | | | 712/225 |
| 2014/0122555 A1* | 5/2014 | Hickmann | ............ | G06F 7/5443 |
| | | | | 708/523 |
| 2019/0056916 A1* | 2/2019 | Varma | ................ | G06F 9/30112 |
| 2020/0034145 A1* | 1/2020 | Bainville | ............ | G06F 9/30189 |
| 2020/0081784 A1* | 3/2020 | Enenkel | ................ | G06F 9/3001 |
| 2021/0157592 A1* | 5/2021 | Horley | ................ | G06F 9/30189 |

OTHER PUBLICATIONS

Wikipedia, "FMA instruction set", accessed Jun. 1, 2020, 6 pages, wikipedia.org (online), URL: https://en.wikipedia.org/wiki/FMA_instruction_set.

* cited by examiner

*Primary Examiner* — Farley Abad

(57) ABSTRACT

Extending fused multiply-add instructions, the method comprising: receiving an extended fused multiply-add (FMA) instruction indicating one or more operands of a fused multiply-add (FMA) operation and one or more transformations to be applied to the one or more operands; and performing, based on the extended FMA instruction, the one or more transformations and the FMA operation.

20 Claims, 5 Drawing Sheets

| Op Code 202 | Transformation Bits 204 | Operand 206a | Operand 206b | Operand 206c |
|---|---|---|---|---|

| Op Code 202 | Transformation Bits 204 | Operand 206a | Operand 206b | Operand 206c |

FIG. 2

EXTENDING FUSED MULTIPLY-ADD INSTRUCTIONS

BACKGROUND

Fused multiply-add instructions are used in various computing tasks to perform a fused multiply-add operation on multiple operands. The operands of the fused-multiply operation may be transformed prior to applying the fused-multiply operation, increasing the overall computational overhead associated with the fused-multiply operation.

BRIEF DESCRIPTION OF THE DRAWINGS

FIG. 2 is an example encoding of an extended fused multiply-add instruction.

DETAILED DESCRIPTION

Figure 1:
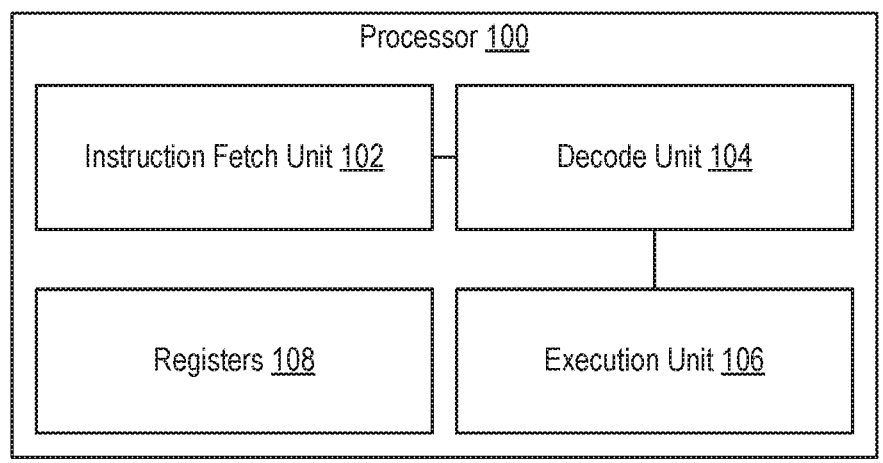
FIG. 1 is a block diagram of an example processor for extending fused multiply-add instructions according to some embodiments.

Fused multiply-add (FMA) operations are used in various computing tasks, such as in convolutions, neural networks, and other machine learning applications. A FMA operation is a mathematical operation where two operands are multiplied together and added to a third operand (e.g., "a*b+c"). In existing solutions, a FMA instruction is used to perform the FMA operation. The FMA instruction is a single executable instruction that indicates the three required operands. Execution of the FMA instruction causes the FMA operation to be performed and may store the result in memory (e.g., a register) storing one of the operands.

In many use cases, one or more transformations may need to be applied to one or more of the operands of the FMA instruction prior to execution of the FMA instruction. For example, where the FMA instruction is configured to accept operands of a particular data type (e.g., double, floats, integers, etc.), operands of other data types may need to be cast to the particular data type. As an example, an integer may need to be cast to a double in order to be used in an FMA instruction that accepts doubles as operands. As another example, bit masking or bit shifting may need to be applied to operands of the FMA instruction depending on the particular use case. Each transformation requires additional instructions that must be fetched and executed prior to executing the FMA instruction. Thus, each transformation increases the overall computational load and reduces the throughput of a processor executing these instructions.

In order to increase throughput in use cases where transformations are required for FMA operands, an extended fused multiply-add (FMA) instruction is used. An extended FMA instruction is a single instruction that, when executed, causes one or more transformations to be applied to one or more operands of a FMA operation and causes performance of the FMA operation using the transformed operands. In other words, both the required transformations for the FMA operands and the FMA operation are performed in response to the execution of a single instruction. As only a single instruction is required to be fetched and executed to perform the transformations and the FMA operation, a substantial increase in processor throughput is achieved.

An extended FMA instruction is encoded to indicate the one or more operands of a FMA operation and one or more transformations to be applied to the one or more operands. Example transformations include bit masking (e.g., applying a bit mask to the operand), bit shifting, or rounding (e.g., floor or ceiling functions). The transformations may include casting, whereby an operand of one data type is converted to another data type. The transformations may also include a conditional zeroing function, where an operand is set to zero based on the value of another operand.

The extended FMA instruction is encoded as a plurality of bits (e.g., 64 bits, 128 bits, etc.), with subsets of the plurality of bits being allocated to indicate the operands and transformations. The operands may be indicated by indicating particular registers storing the values of the operands.

The extended FMA instruction may be encoded according to a variety of approaches. For example, in one embodiment, the extended FMA instruction may be one of a plurality of extended FMA instructions (e.g., an "extended FMA instruction set") each corresponding to a different combination of transformation-operand groupings. For example, a first extended FMA instruction may be used to perform the operation "a=trans1($a$)*trans2($b$)+trans3($c$)", where trans1, trans2, and trans3 are transformation functions applied to a corresponding operand. A second extended FMA instruction may be used to perform the operation "a=trans4($a$)*trans5($b$)+trans6($c$)", where trans4, trans5, and trans6 are transformation functions applied to a corresponding operand. In these examples, each transformation function (e.g., trans1, trans2, etc.) may correspond to a single transformation or combination of transformations applied to the corresponding operand. Moreover, each transformation function may be identical or different within the same extended FMA instruction. Furthermore, each operand need not have a transformation applied to it, with only a subset of the operands having corresponding transformations. Accordingly, the extended FMA instruction set may be encoded for each possible combination of transformations that may be applied to each operand, or a predefined enumeration of transformation-operand groupings. Thus, a compiler determines which transformations are applied to which operands, and selects an extended FMA instruction from the extended FMA instruction set to effect the particular transformations and execute the FMA operation.

In other embodiments, a subset of bits encoded in the extended FMA instruction may indicate which transformations are applied to which operands. For example, a first subset of bits may indicate the transformations for a first operand, a second subset of bits may indicate the transformations for a second operand, and a third subset of bits may indicate the transformations for a third operand. In some embodiments, a particular transformation for a particular operand may correspond to a particular bit. Where the particular bit is raised (e.g., set to "1"), that transformation is applied to that operand. In other embodiments, multiple bits may be used to indicate whether a particular transformation is applied to a particular operand. For example, a plurality of bits may indicate by how many bits an operand should be shifted. No bit shifting occurs where the plurality of bits is set to zero, while bit shifting occurs where the plurality of bits is set to a non-zero value. In further embodiments, the transformations to be applied may be indicated in a stored value (e.g., a value stored in a register).

For example, one or more bits of a stored value may indicate the particular transformations applied to particular operands. The extended FMA instruction may then indicate the particular register storing the value. Accordingly, a compiler may generate an instruction to store the value in the particular register and generate the extended FMA instruction to indicate the particular register.

The transformations for a particular operand may be performed based on another parameter. For example, a bit shift operation is performed based on a parameter indicating by how many bits the operand is to be shifted and/or a direction for the bit shift. As another example, a bit masking operation is performed based on a parameter of the bit mask to be applied. In some embodiments, the parameter for a particular transformation may be encoded in the extended FMA instruction. In these embodiments, the parameter may effectively indicate whether or not a particular transformation is to be performed. For example, bits allocated to indicate the number of shifted bits of a bit shift operation, when set to zero, indicate that the bit shift operation may not be performed. As another example, bits allocated for a bit mask of a bit mask operation, when set to all "1"s, indicate that the bit masking operation may not be performed. In other embodiments, the parameters of a transformation may be encoded in a stored value (e.g., stored in a register) indicated in the extended FMA instruction. Accordingly, a compiler may generate one or more store instructions to store the parameters, encoded as one or more values, in one or more registers and generate the extended FMA instruction to identify the one or more registers.

FIG. 1 is a block diagram of a non-limiting example processor 100 for extending fused multiply-add instructions. The example processor 100 may include a central processing unit (CPU) of a computing device. The example processor 100 can also include a processor of a hardware accelerator, such as a graphics processing unit (GPU). The processor 100 includes an instruction fetch unit 102 that receives an extended FMA instruction. The extended FMA instruction may be received by accessing memory storing the extended FMA instruction. The extended FMA instruction may also be received from another device or component requesting that the processor perform the extended FMA instruction. The extended FMA instruction may be stored into or loaded from an instruction cache and/or instruction queue.

The decode unit 104 decodes the extended FMA instruction and provides the decoded extended FMA instruction to the execution unit 106. The execution unit 106 is an execution path of the processor 100 for executing instructions including the extended FMA instruction. Execution of the extended FMA instruction by the execution unit 106 causes one or more transformations to be applied to one or more operands of the extended FMA instruction and causes an FMA operation to be performed using the operands of the extended FMA instruction. Accordingly, executing the extended FMA instruction may cause values for the one or more operands to be loaded from registers 108. In some embodiments, executing the extended FMA instruction may cause one or more values indicating the one or more transformations to be loaded from registers 108. In some embodiments, executing the extended FMA instruction may cause one or more values indicating one or more parameters of the one or more transformations to be loaded from registers 108. Executing the extended FMA instruction may also cause a result of performing the FMA operation to be stored in a register 108.

As both the transformations and the FMA operation are performed via a single instruction introduced into the execution unit 106, the transformations and FMA operations are performed in a reduced number of clock cycles when compared to using separate transformation instructions and existing FMA instructions. Thus, throughput is greatly increased. Where the processor 100 is included in a dedicated hardware accelerator such as a GPU, the performance increases are more substantial as the hardware accelerator may perform a greater number of FMA operations compared to other components.

FIG. 2 shows an example encoding of an extended FMA instruction. The extended FMA instruction includes a plurality of bits. The plurality of bits are used to encode the op code 202, transformation bits 204, and operands 206a,b,c. It is understood that the number of bits used to encode the FMA instruction may vary depending on the particular architecture in which it is implemented. Moreover, it is understood that a varying number of bits may be used to encode each of the op code 202, transformation bits 204, and operands 206a,b,c. It is further understood that the extended FMA instruction may include other bits, and that the ordering of the bits within the extended FMA instruction may be rearranged.

The operands 206a,b,c indicate values or registers storing values to be used as operands for a FMA operation. The op code 202 is an identifier to indicate an instruction as an extended FMA instruction. The op code 202 may indicate an extended FMA instruction for performing an FMA operation on operands of a particular data type (e.g., double, floats, etc.). The op code 202 may also indicate an extended FMA instruction from a plurality of extended FMA instructions each corresponding to a particular transformation-operand grouping. In other words, the op code 202 indicates which transformations will be applied to which operands of the extended FMA instruction.

The transformation bits 204 include one or more bits indicating particular transformations and/or particular parameters of transformations to be applied to the operands 206a,b,c. In some embodiments, the transformation bits 204 include one or more bit flags indicating whether a particular transformation will be applied to a particular operand 206a, b,c. In some embodiments, the transformation bits 204 encode one or more parameters for a transformation. For example, the transformation bits 204 may encode a bit mask to be applied to one or more operands 206a,b,c. As another example, the transformation bits 204 may indicate a number of bits to be shifted in a bit shift operation for one or more operands 206a,b,c. As a further example, the transformation bits 204 may indicate one or more of the operands 206a,b,c and/or one or more criteria for a conditional zeroing operation. In some embodiments, the transformation bits 204 may indicate a register storing a value indicating particular transformations and/or particular parameters of transformations to be applied to the operands 206a,b,c. In some embodiments, the transformation bits 204 may indicate one or more registers storing one or more parameters for the transformations.

Figure 3:
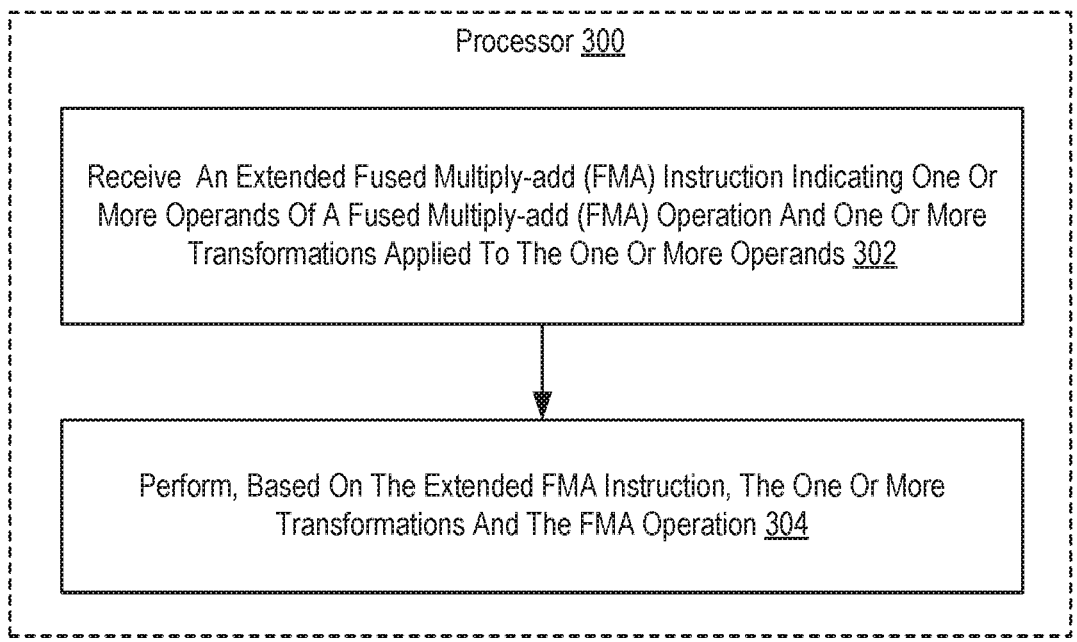
FIG. 3 is a flowchart of an example method for extending fused multiply-add instructions according to some embodiments.

For further explanation, FIG. 3 sets forth a flow chart illustrating an exemplary method for extending fused multiply-add instructions that includes receiving 302 (e.g., by a processor 300), an extended fused multiply-add (FMA) instruction indicating one or more operands of a fused multiply-add (FMA) operation and one or more transformations applied to the one or more operands. The extended FMA instruction is a single instruction that effects both the one or more transformations and the FMA operation on execution. Example transformations include bit masking (e.g., applying a bit mask to the operand), bit shifting, or rounding (e.g., floor or ceiling functions). The transformations may include casting, whereby an operand of one data type is converted to another data type. The transformations may also include a conditional zeroing function, where an operand is set to zero based on the value of another operand. Receiving 302 the extended FMA instruction may include fetching the extended FMA instruction from memory and/or loading the extended FMA instruction from an instruction cache. Receiving 302 the extended FMA instruction may also include receiving 302 the extended FMA instruction from another component for execution.

The method of FIG. 3 also includes performing 304, based on the extended FMA instruction, the one or more transformations and the FMA operation. Performing 304 the one or more transformations and the FMA operation may include providing the extended FMA instruction to an execution component (e.g., an execution path) of the processor 300. Thus, by providing a single instruction to the execution path of the processor 300, both the transformations indicated in the extended FMA instruction and the FMA operation indicated in the extended FMA instruction are performed. Thus, a processor 300 throughput improvement is achieved when compared to using separate transformation and FMA instructions.

Figure 4:
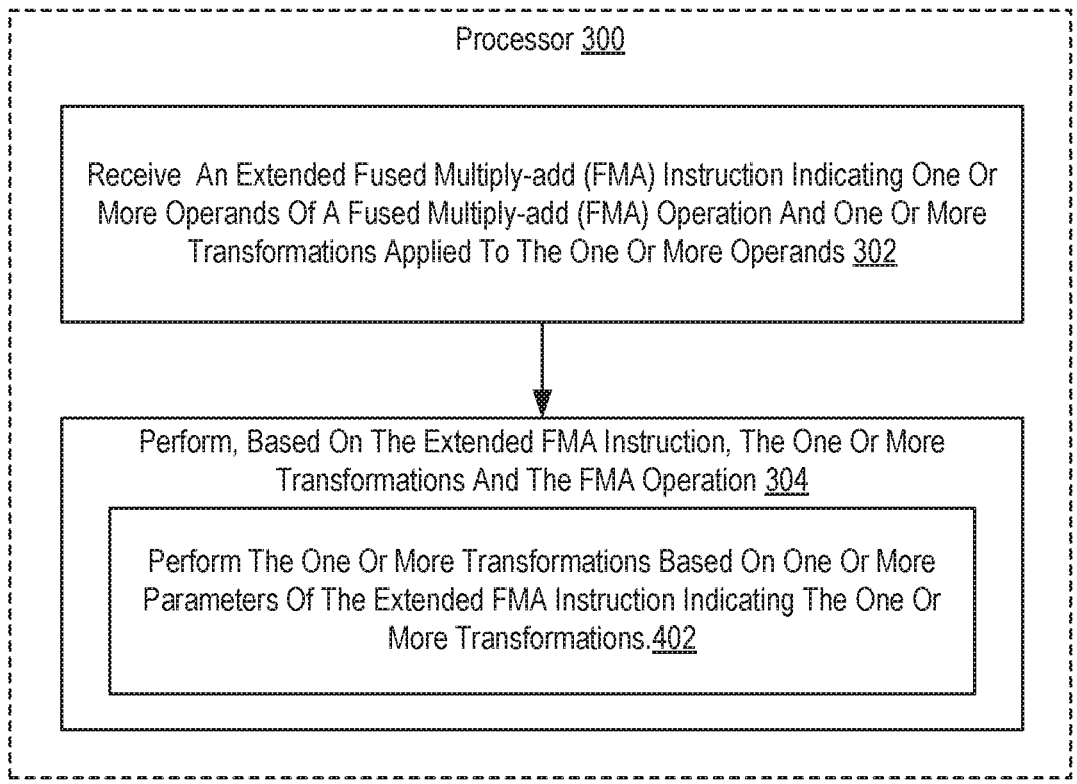
FIG. 4 is a flowchart of an example method for extending fused multiply-add instructions according to some embodiments.

For further explanation, FIG. 4 sets forth a flow chart illustrating an exemplary method for extending fused multiply-add instructions that includes receiving 302 (e.g., by a processor 300), an extended fused multiply-add (FMA) instruction indicating one or more operands of a fused multiply-add (FMA) operation and one or more transformations applied to the one or more operands; and performing 304, based on the extended FMA instruction, the one or more transformations and the FMA operation.

The method of FIG. 4 differs from FIG. 3 in that performing 304, based on the extended FMA instruction, the one or more transformations and the FMA operation includes performing 402 the one or more transformations based on one or more parameters of the extended FMA instruction indicating the one or more transformations. For example, in some embodiments, the extended FMA instruction may be one of a plurality of extended FMA instructions each corresponding to a different combination of transformation-operand groupings. Accordingly, the op code of the extended FMA instruction indicates the one or more transformations. In other embodiments, a subset of bits encoded in the extended FMA instruction may indicate which transformations are applied to which operands. For example, a first subset of bits may indicate the transformations for a first operand, a second subset of bits may indicate the transformations for a second operand, and a third subset of bits may indicate the transformations for a third operand. In some embodiments, a particular transformation for a particular operand may correspond to a particular bit. Where the particular bit is raised (e.g., set to "1"), that transformation is applied to that operand. In other embodiments, multiple bits may be used to indicate whether a particular transformation is applied to a particular operand. For example, a plurality of bits may indicate by how many bits an operand should be shifted. No bit shifting occurs where the plurality of bits is set to zero, while bit shifting occurs where the plurality of bits is set to a non-zero value. As another example, bits allocated for a bit mask of a bit mask operation, when set to all "1"s, indicate that the bit masking operation may not be performed.

Figure 5:
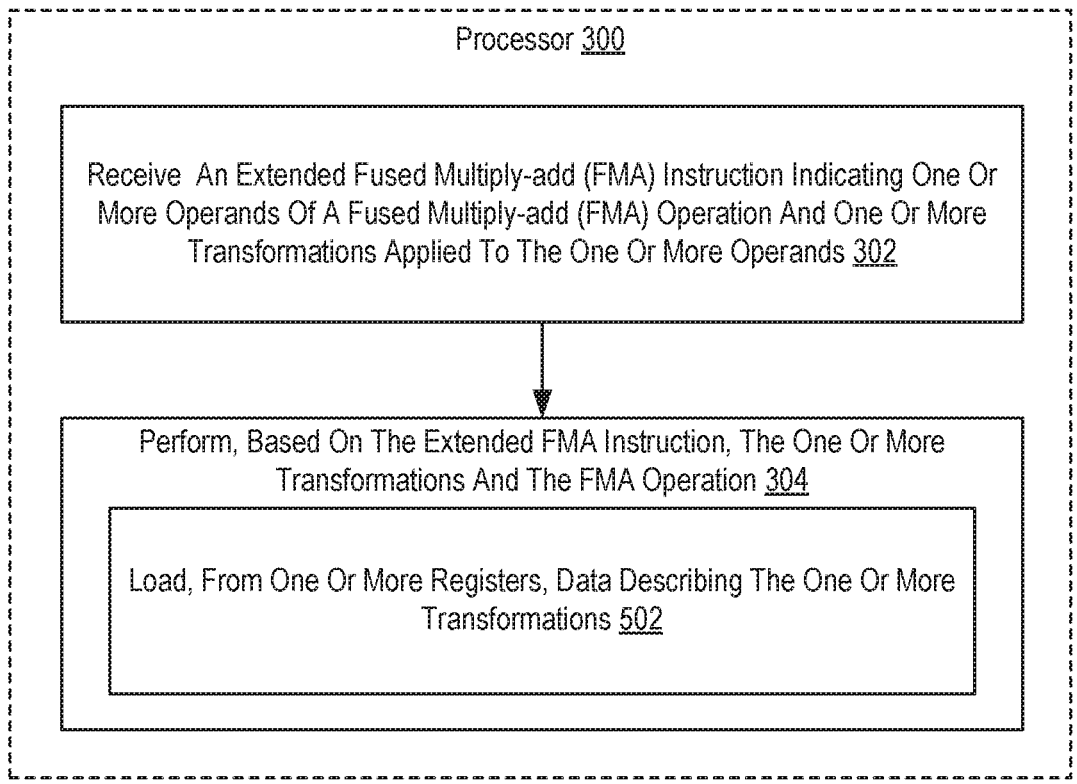
FIG. 5 is a flowchart of an example method for extending fused multiply-add instructions according to some embodiments.

For further explanation, FIG. 5 sets forth a flow chart illustrating an exemplary method for extending fused multiply-add instructions that includes receiving 302 (e.g., by a processor 300), an extended fused multiply-add (FMA) instruction indicating one or more operands of a fused multiply-add (FMA) operation and one or more transformations applied to the one or more operands; and performing 304, based on the extended FMA instruction, the one or more transformations and the FMA operation.

The method of FIG. 5 differs from FIG. 4 in that performing 304, based on the extended FMA instruction, the one or more transformations and the FMA operation includes loading 502, from one or more registers, data describing the one or more transformations. The data describing the one or more transformations may include a plurality of bit flags indicating whether a respective transformation is applied to a respective operand. The data describing the one or more transformations may also include a parameter of a particular transformation. A parameter of a transformation is a value required to complete a transformation on a particular operand. For example, the parameter may include a bit mask for a bit mask operation, a number of bits for a bit shifting operation, and the like. In some embodiments, the parameter serves as an indication of whether a particular transformation is performed. For example, it may be indicated that a bit shifting operation will not be performed by setting the number of bits to zero. As another example, it may be indicated that a bitmask operation will not be performed by setting a bit mask to all 1's (e.g., an identity bit mask). The particular registers from which the data is loaded may be indicated in the extended FMA instruction, or be predefined or predesignated registers.

In view of the explanations set forth above, readers will recognize that the benefits of extending fused multiply-add instructions include:
Improved performance of a computing system by increasing processing throughput through the use of a single instruction to both effect transformations on fused multiply-add operands and perform the fused multiply-add operation.

Exemplary embodiments of the present disclosure are described largely in the context of a fully functional computer system for extending fused multiply-add instructions. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of extending fused multiply-add instructions, the method comprising:
    receiving an extended fused multiply-add (FMA) instruction comprising a first subset of bits indicating each operand of a fused multiply-add (FMA) operation, a second subset of bits indicating one or more transformations applicable to one or more operands of the FMA operation, and a parameter indicating whether or not the one or more transformations will be performed; and performing, based on the extended FMA instruction and the parameter, the one or more transformations and the FMA operation.

2. The method of claim 1, wherein performing the one or more transformations and the FMA operation comprises performing the one or more transformations based on one or more parameters of the extended FMA instruction indicating the one or more transformations.

3. The method of claim 1, wherein performing the one or more transformations and the FMA operation comprises loading, from one or more registers, data describing the one or more transformations.

4. The method of claim 1, wherein the extended FMA instruction is one of a plurality of extended FMA instructions each corresponding to a different combination of transformation-operand groupings.

5. The method of claim 1, wherein the one or more transformations comprise a bit masking transformation.

6. The method of claim 1, wherein the one or more transformations comprise a bit shifting operation.

7. The method of claim 1, wherein the one or more transformations comprises a rounding operation.

8. The method of claim 1, wherein the one or more transformations comprises a casting operation.

9. The method of claim 1, wherein the one or more transformations comprises a conditional zeroing operation.

10. An apparatus for extending fused multiply-add instructions, the apparatus configured to perform steps comprising:

receiving an extended fused multiply-add (FMA) instruction comprising a first subset of bits indicating each operand of a fused multiply-add (FMA) operation, a second subset of bits indicating one or more transformations applicable to one or more operands of the FMA operation, and a parameter indicating whether or not the one or more transformations will be performed; and performing, based on the extended FMA instruction and the parameter, the one or more transformations and the FMA operation.

11. The apparatus of claim 10, wherein performing the one or more transformations and the FMA operation comprises performing the one or more transformations based on one or more parameters of the extended FMA instruction indicating the one or more transformations.

12. The apparatus of claim 10, wherein performing the one or more transformations and the FMA operation comprises loading, from one or more registers, data describing the one or more transformations.

13. The apparatus of claim 10, wherein the extended FMA instruction is one of a plurality of extended FMA instructions each corresponding to a different combination of transformation-operand groupings.

14. The apparatus of claim 10, wherein the one or more transformations comprise a bit masking transformation.

15. The apparatus of claim 10, wherein the one or more transformations comprise a bit shifting operation.

16. The apparatus of claim 10, wherein the one or more transformations comprises a rounding operation.

17. The apparatus of claim 10, wherein the one or more transformations comprises a casting operation.

18. The apparatus of claim 10, wherein the one or more transformations comprises a conditional zeroing operation.

19. A computer program product disposed upon a non-transitory computer readable medium, the computer program product comprising computer program instructions for extending fused multiply-add instructions that, when executed, cause a computer system to perform steps comprising:

receiving an extended fused multiply-add (FMA) instruction comprising a first subset of bits indicating each operand of a fused multiply-add (FMA) operation, a second subset of bits indicating one or more transformations applicable to one or more operands of the FMA operation, and a parameter indicating whether or not the one or more transformations will be performed; and performing, based on the extended FMA instruction and the parameter, the one or more transformations and the FMA operation.

20. The computer program product of claim 19, wherein performing the one or more transformations and the FMA operation comprises performing the one or more transformations based on one or more parameters of the extended FMA instruction indicating the one or more transformations.

* * * * *